(12) United States Patent
Yoshida et al.

(10) Patent No.: US 6,429,866 B1
(45) Date of Patent: Aug. 6, 2002

(54) THREE-DIMENSIONAL GRAPHICS DRAWING APPARATUS CALCULATING TONE OF PIXEL BASED ON TONES OF PIXELS AT PRESCRIBED INTERVALS, METHOD THEREOF AND MEDIUM RECORDED WITH PROGRAM THEREFOR

(75) Inventors: Kanako Yoshida; Tadashi Sakamoto, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,981

(22) Filed: Sep. 15, 1999

(30) Foreign Application Priority Data

Apr. 1, 1999 (JP) .............................. 11-094875

(51) Int. Cl.[7] .............................................. G06T 15/40
(52) U.S. Cl. ...................................... 345/422; 345/589
(58) Field of Search ................................ 345/421, 422, 345/419, 418, 426, 589

(56) References Cited

U.S. PATENT DOCUMENTS

| | | | | |
|---|---|---|---|---|
| 5,031,117 A | * | 7/1991 | Minor et al. ................. | 345/426 |
| 5,852,443 A | * | 12/1998 | Kenworthy .................. | 345/441 |
| 5,854,631 A | * | 12/1998 | Akeley et al. ............... | 345/419 |
| 5,864,342 A | * | 1/1999 | Kajiya et al. ............... | 345/418 |
| 6,160,557 A | * | 12/2000 | Narayanaswami .......... | 345/422 |
| 6,184,888 B1 | * | 2/2001 | Yuasa et al. ................. | 345/419 |
| 6,204,859 B1 | * | 3/2001 | Jouppi et al. ............... | 345/431 |
| 6,211,882 B1 | * | 4/2001 | Pearce et al. ............... | 345/419 |

FOREIGN PATENT DOCUMENTS

JP 2774874 4/1998

\* cited by examiner

*Primary Examiner*—Mark Zimmerman
*Assistant Examiner*—Huedung X. Cao
(74) *Attorney, Agent, or Firm*—McDermott, Will & Emery

(57) ABSTRACT

A three-dimensional graphics drawing apparatus includes a hidden surface calculating portion to determine whether or not a part is visible on the picture screen based on three-dimensional data, a tone calculating portion to calculate the tones of pixels at prescribed intervals in a part determined to be visible on the picture screen by the hidden surface calculating portion, an interpolating portion to interpolate a pixel whose tone has not been calculated, based on the tones of pixels at the prescribed intervals calculated by the tone calculating portion, and a drawing portion to draw graphics on the picture screen based on the result of calculation by said calculating portion and the result of interpolation by said interpolating portion. The interpolating portion interpolates a pixel whose tone has not been calculated, based on the tones of pixels at prescribed intervals calculated by the tone calculating portion, therefore the time required for calculating the tones of pixels can be reduced and the drawing speed can be improved.

14 Claims, 6 Drawing Sheets

THREE-DIMENSIONAL GRAPHICS DRAWING APPARATUS CALCULATING TONE OF PIXEL BASED ON TONES OF PIXELS AT PRESCRIBED INTERVALS, METHOD THEREOF AND MEDIUM RECORDED WITH PROGRAM THEREFOR

BACKGROUND OF THE INVENTION

1. Field of the Invention

The present invention relates generally to a technique of displaying an object on a two-dimensional picture screen using three-dimensional graphics, and more particularly, to a three-dimensional graphics drawing apparatus which permits the drawing speed to be increased, a method of drawing three-dimensional graphics, and a medium recorded with such program for drawing three-dimensional graphics.

2. Description of the Background Art

The three-dimensional graphics, which require a huge amount of calculation, has been implemented in equipment storing specific hardware such as a floating point unit (hereinafter simply as FPU), a video card having a special graphic engine and a high-performance work station.

FIG. 1 is a flow chart for use in illustration of the process to implement conventional three-dimensional graphics. The user inputs three-dimensional data to produce a key frame, the positional data of an object at particular time (S101). Data including the shape, color and movement of a three-dimensional object, the eye position (visual point), field of view, and the placement of an optical source must be simplified and abstracted in expression so that a computer can handle the object as three-dimensional data. The abstraction process is generally called "modeling", and data produced by the modeling is called "model." The model includes a shape model (the geometrical shape of an object), a surface model (information on surface color and texture), an optical source model (the size and property of an optical source), a movement model (movement and change of the object) and a field of view model (a visual point, the direction of line of vision, and the angle of sight). The three-dimensional data input in step S101 is any model other than the movement model.

Then, based on the positional data of the key frame produced in step S101, a movement model in a frame between key frames is produced by a method of obtaining an interpolated value by three-dimensional spline (step S 102). By producing the movement model, the shape model, surface model, optical source model and field of view model for each key frame do not have to be produced, the amount of necessary data can be greatly reduced.

Then, various models input in step S101 and the movement model produced in step S102 are used to calculate the shape and color of the object to be displayed on the picture screen (calculation of hidden surface, tone) (S103).

Then, in step S103, the hidden surface is processed and the tone-calculated drawing information is written into a frame memory to draw graphics on the picture screen (S104). If the drawing of the final frame previously specified by the user has not been completed, the process returns to step S103 and the above-described processing is repeated.

In recent years, in the field of commercial equipment such as car navigation system, the user came to demand more objectively easy-to-understand picture display, and much energy has been devoted to development of equipment using three-dimensional graphics. However, in equipment such as car navigation system, there is restriction in the cost and expensive hardware such an FPU and a special graphic engine could hardly be installed. In commercial equipment such as car navigation system, the above processing must be executed using a CPU (Central Processing Unit) without instructions for special graphics. Among the above described processing steps, tone must be calculated on a one-pixel-basis, a very large amount of calculation is involved, which takes long, and three-dimensional graphics could not be implemented at high speed.

SUMMARY OF THE INVENTION

It is an object of the present invention to provide three-dimensional graphics drawing apparatus which permits three-dimensional graphics to be implemented at high speed without having to install expensive hardware.

Another object of the present invention is to provide three-dimensional graphics drawing apparatus which permits three-dimensional graphics to be implemented without degrading the picture quality.

Yet another object of the present invention is to provide a method of drawing three-dimensional graphics which permits three-dimensional graphics to be implemented at high speed without having to install expensive hardware.

A further object of the present invention is to provide a method of drawing three-dimensional graphics which permits three-dimensional graphics to be implemented at high speed without degrading the picture quality.

A still further object of the present invention is to provide a medium recorded with a three-dimensional graphics drawing program which permits three-dimensional graphics to be implemented at high speed without having to install expensive hardware.

An additional object of the present invention is to provide a medium recorded with a three-dimensional graphics drawing program which permits three-dimensional graphics to be implemented at high speed without degrading the picture quality.

According to one aspect of the present invention, a three-dimensional graphics drawing apparatus includes a hidden surface calculating portion to determine whether or not a part is visible on the picture screen based on three-dimensional data, a tone calculating portion to calculate the tones of pixels at prescribed intervals in a part determined to be visible on the picture screen by the hidden surface calculating portion, an interpolating portion to interpolate pixels whose tones are not calculated based on the tones of the pixels at prescribed intervals calculated by the tone calculating portion, and a drawing portion to draw graphics on the picture screen based on the result of calculation by the tone calculating portion and the result of interpolation by the interpolating portion.

The interpolating portion interpolates the pixels whose tones are not calculated, based on the tones of pixels at prescribed intervals, calculated by the tone calculating portion, and therefore time required for calculating the tones of pixels can be reduced and the drawing speed can be increased.

According to another aspect of the present invention, the method of drawing three-dimensional graphics includes the steps of determining whether or not a part is visible on the picture screen based on three-dimensional data, calculating the tones of pixels at prescribed intervals in a part determined to be visible on the picture screen, interpolating pixels whose tone is not calculated, based on the calculated tones of pixels at prescribed intervals, and drawing graphics on the picture screen based on the pixels whose tones are calculated and the interpolated pixels.

Pixels whose tones are not calculated are interpolated based on the calculated tones of the pixels at prescribed intervals, and therefore time required for calculating the tones of pixels can be reduced, so that the drawing speed can be increased.

According to yet another aspect of the present invention, the three-dimensional graphics drawing program recorded on a medium includes the steps of determining whether a part is visible on the picture screen based on three-dimensional data, calculating the tones of pixels at prescribed intervals in a part determined to be visible on the picture screen, interpolating pixels whose tones are not calculated based on the calculated tones of the pixels at prescribed intervals, and drawing graphics on the picture screen based on the tone-calculated pixels and the interpolated pixels.

Since the pixels are interpolated based on the calculated tones of the pixels at prescribed intervals, time required for calculating the tones of pixels can be reduced, so that the drawing speed can be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
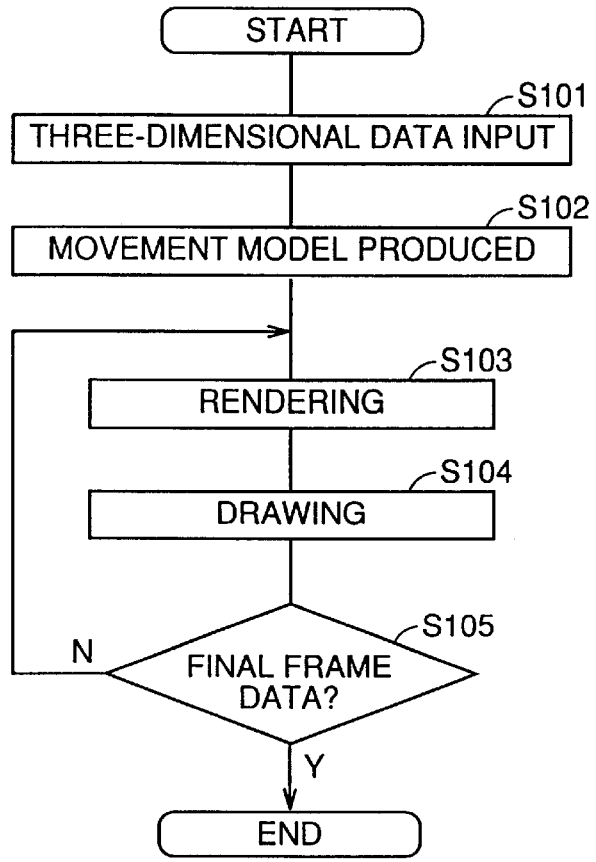
FIG. 1 is a flow chart for use in illustration of a conventional process of implementing three-dimensional graphics.
Figure 2:
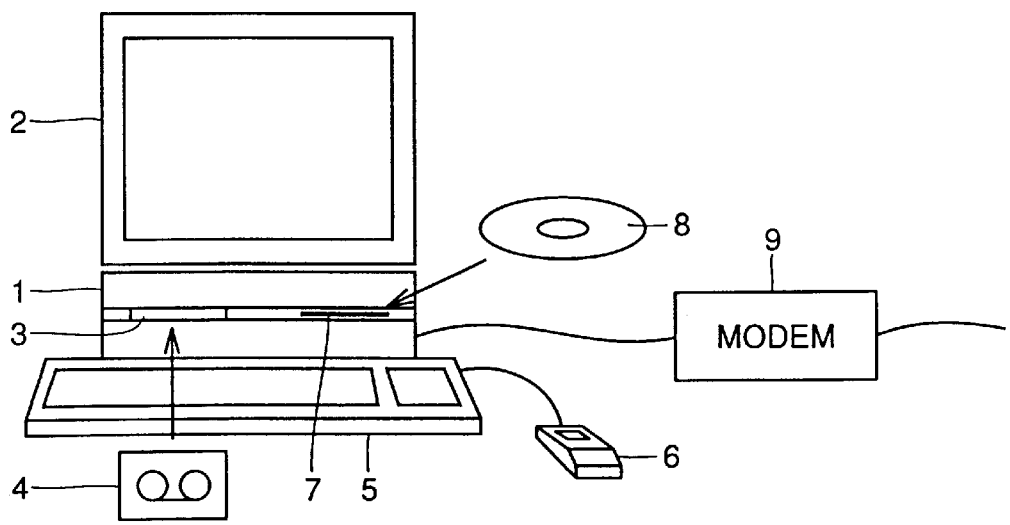
FIG. 2 is an overview of a three-dimensional graphics drawing apparatus according to the present invention.

FIG. 2 is an overview of a three-dimensional graphics drawing apparatus according to the present invention. The three-dimensional graphics drawing apparatus includes a computer main body 1, a graphic display device 2, a magnetic tape device 3 having a magnetic tape 4, a keyboard 5, a mouse 6, a CD-ROM device 7 provided with a CD-ROM (Compact Disc-Read Only Memory) 8, and a communication modem 9. The three-dimensional graphics drawing program is supplied from a recording medium such as magnetic tape 4 and CD-ROM 8. The three-dimensional graphics drawing program is executed by computer main body 1, and the operator operates keyboard 5 or mouse 6 to draw three-dimensional graphics while watching graphic display device 2. The three-dimensional graphics drawing program may be supplied to computer main body 1 through communication modem 9.

Note that the three-dimensional graphics drawing apparatus is implemented by computer main body 1 while it is understood that it may be implemented by commercial equipment such as car navigation system including a general-purpose CPU.

Figure 3:
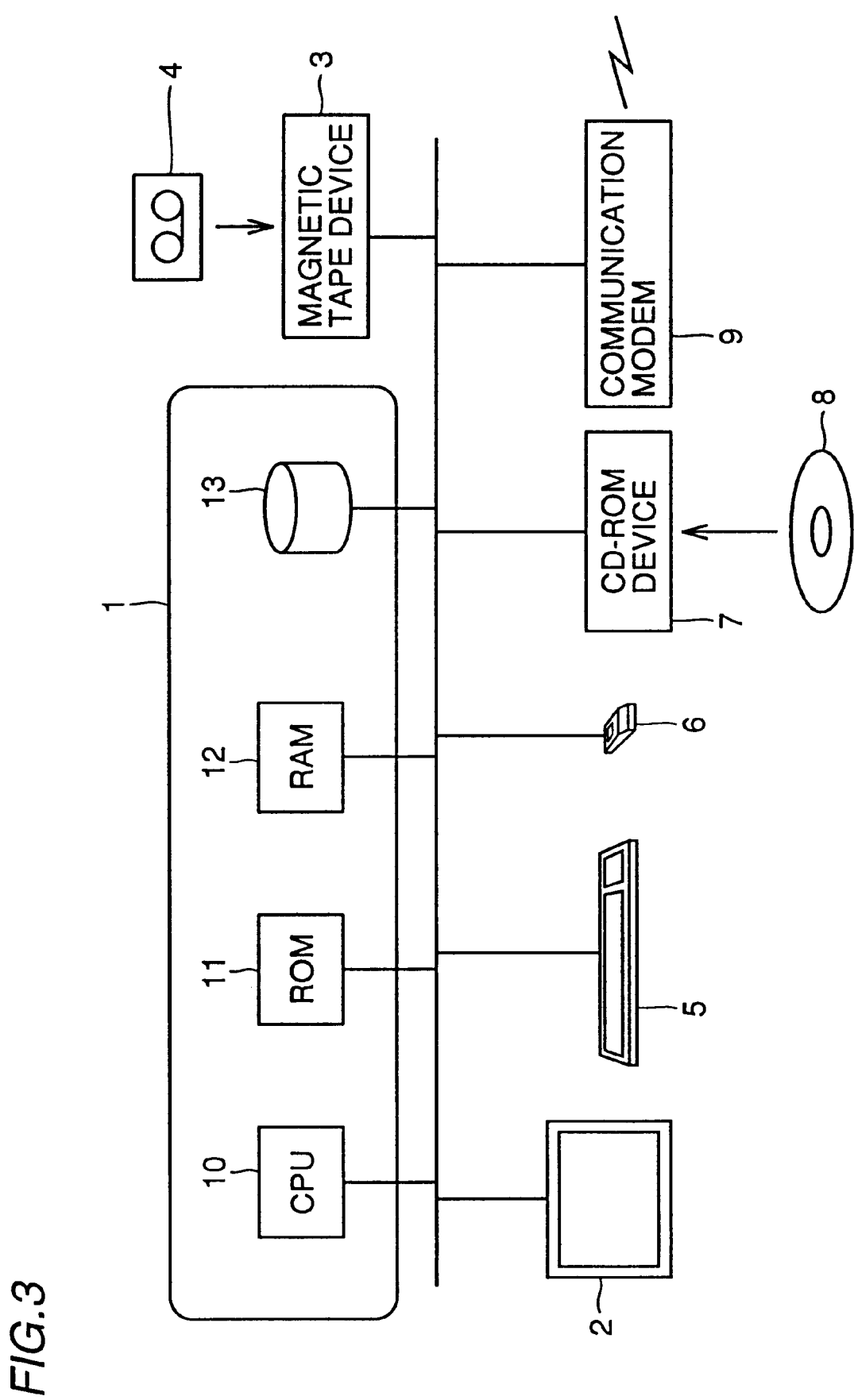
FIG. 3 is a diagram of the construction of a three-dimensional graphics drawing apparatus according to the present invention.

FIG. 3 is a block diagram of a three-dimensional graphics drawing apparatus according to the present invention by way of illustration. Computer main body 1 shown in FIG. 2 includes a CPU 10, a ROM (Read Only Memory) 11, a RAM (Random Access Memory) 12 and a hard disk 13. CPU 10 performs various processings while exchanging data with graphic display device 2, magnetic tape device 3, keyboard 5, mouse 6, CD-ROM device 7, communication modem 9, ROM 11, RAM 12 or hard disk 13. A three-dimensional graphics drawing program recorded on magnetic tape 4 or CD-ROM 8 is stored once in hard disk 13 through magnetic tape device 3 or CD-ROM device 7 under the control of CPU 10. CPU 10 execute the three-dimensional graphics drawing program loaded from hard disk 13 into RAM 12 as needed for drawing three-dimensional graphics.

Now, the principles of the present invention will be briefly described. In order to calculate the tones of pixels, values for r (red), g (green) and (b) blue, using the simplest tone calculation method, the Lambert's law, for example, the intensity of light (i) can be obtained by the following expression:

$$i = Pa + Pd \times d \qquad (1)$$

wherein Pa represents ambient light, Pd represents diffused reflected light.

In expression (1), d is determined by the following expression:

$$d = MAX(0, N \cdot L) \qquad (2)$$

wherein L represents the vector of light L (lx, ly, lz) determined from the position of the optical source and directional data, N represents the normal vector N (nx, ny, nz) of an object corresponding to a pixel the color of which is to be calculated, and MAX (a, b) is an expression indicating the larger one of values a and b is to be selected. The expression to calculate N·L in expression (2) is as follows:

$$N \cdot L = nx \times lx + ny \times ly + nz \times \qquad (3)$$

The intensity of light i is multiplied by r, g and b to produce the tone information of a pixel as in the following expressions (4) to (6). ($r_0$, $g_0$, $b_0$) represents the color data of the object.

$$r = r_0 \times i \qquad (4)$$

$$g = g_0 \times i \qquad (5)$$

$$b = b_0 \times i \qquad (6)$$

These r, g and b obtained by expression (4) to (6) may exceed the number of colors depending upon values set for Pa and Pd. The number of colors is 256 if r, g and b are each in 8-bit representation. In this case, the following correction will be necessary.

$$r = (r \times \text{number of colors})/c \qquad (7)$$

$$g = (g \times \text{number of colors})/c \qquad (8)$$

$$b = (b \times \text{number of colors})/c \qquad (9)$$

wherein c=MAX AX (b, MAX (r, g)), number of colors), and c is not the number of colors. If c is equal to the number of colors, the above expressions (7) to (9) are not necessary.

From the above expressions (1) to (9), at most 3 additions, 9 multiplications, 3 divisions and 4 determinations, i.e., 19 processing steps altogether are necessary for calculating the tone of one pixel. If the tones of pixels adjacent to the pixel of interest have already been calculated, the Z values of the pixel of interest and adjacent pixels are compared and the tone of the pixel having the closest Z value is used as the tone of the pixel of interest, so that the tone can be obtained by at most 4 determination steps. The Z value is a value calculated using the Z buffer method for the hidden surface calculation process. Since algorithms to calculate the Z value is well known, detailed description is not provided.

Figure 4:
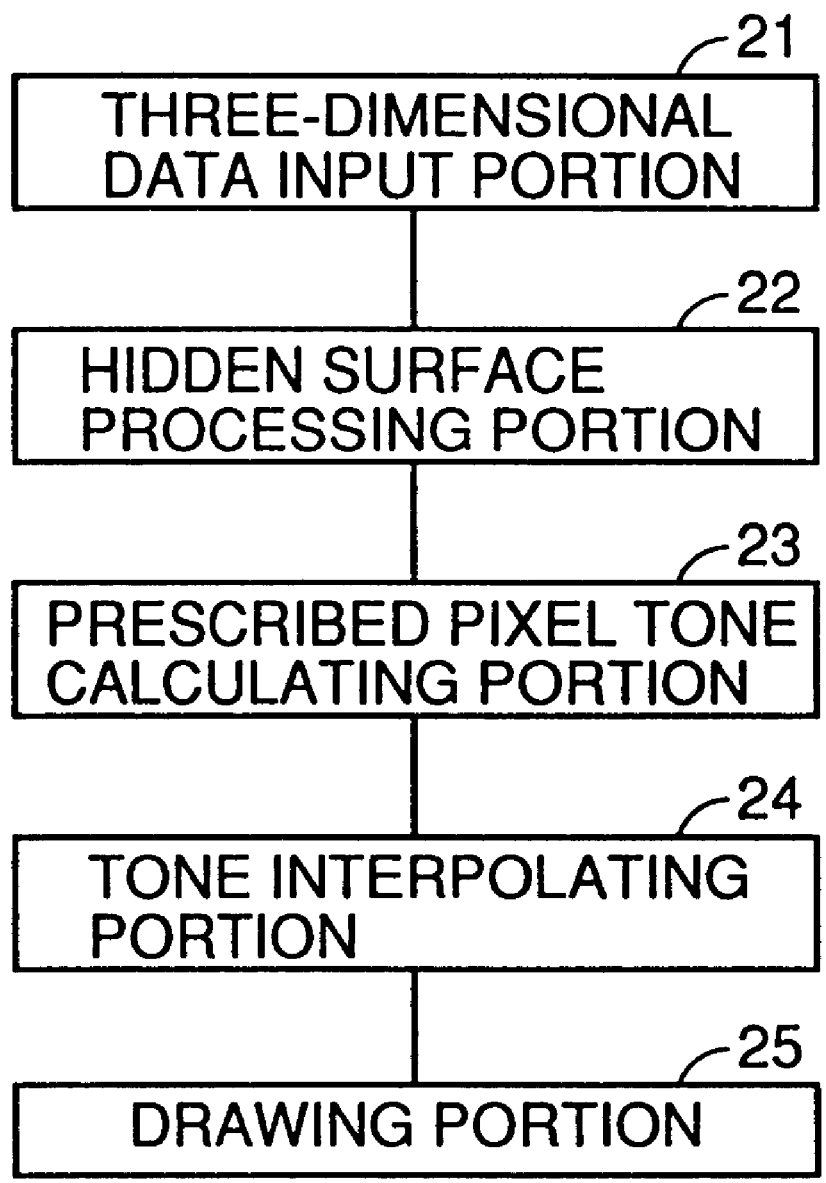
FIG. 4 is a block diagram for use in illustration of a three-dimensional graphics drawing apparatus according to one embodiment of the present invention.

FIG. 4 is a block diagram for use in illustration of the general construction of a three-dimensional graphics drawing apparatus according to this embodiment. This three-dimensional graphics drawing apparatus includes a three-dimensional data input portion 21 provided with various models (three-dimensional data) including the movement models described in connection with the conventional apparatus, a hidden surface processing portion 22 to determine whether or not a part is visible on the picture screen when three-dimensional data input to three-dimensional data input portion 21 is turned into a drawn picture on the screen, a prescribed pixel tone calculating portion 23 to calculate the tones of pixels at certain intervals in a surface determined to be visible on the screen by hidden surface processing portion 22, tone interpolating portion 24 to set the tone of a pixel not processed by prescribed pixel tone calculating portion 23, based on the tones of pixels around the pixel, and a drawing portion 25 to turn two-dimensional drawing data produced by prescribed tone calculating portion 23 and tone interpolating portion 24 into drawn graphics in graphic display device 2.

The various models including the movement model input to three-dimensional data input portion 21 has been already produced. Drawing portion 25 performs drawing in graphic display by writing the two-dimensional data produced by tone calculating portion 23 and tone interpolating portion 24 into a frame memory.

Figure 5:
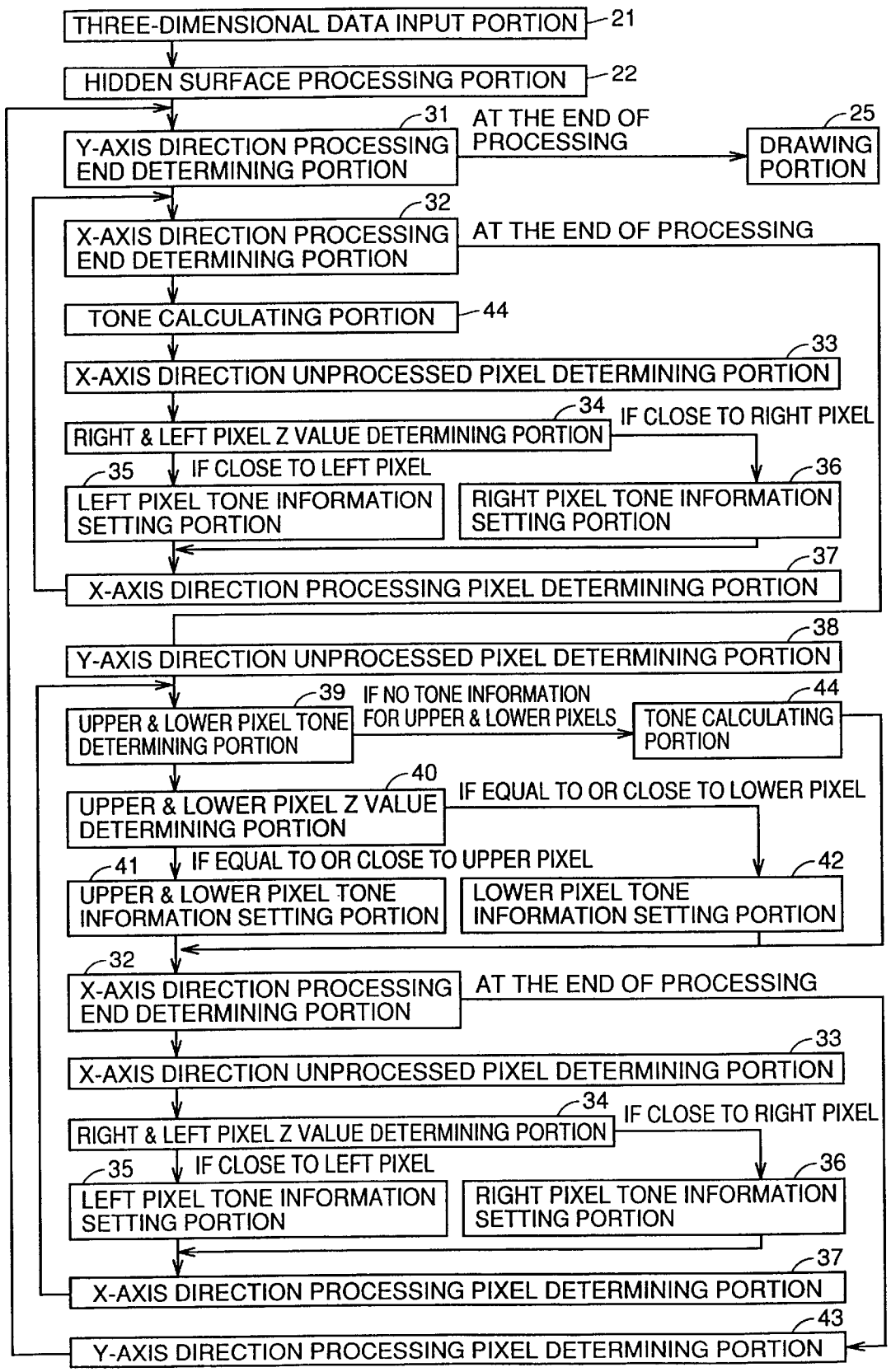
FIG. 5 is a block diagram for use in detailed illustration of a prescribed pixel tone calculating portion 23 and a tone interpolating portion 24.

FIG. 5 is a block diagram for use in detailed illustration of the construction of prescribed pixel tone calculating portion 23 and tone interpolating portion 24 shown in FIG. 4. Prescribed pixel tone calculating portion 23 and tone interpolating portion 24 include a Y-axis direction processing end determining portion 31 to determine whether or not a process in the Y-axis direction is performed to the end, an X-axis direction processing end determining portion 32 to determine whether a process in the X-direction to a certain Y-axis coordinate is performed to the end, an X-axis direction unprocessed pixel determining portion 33 to determine whether or not there is a pixel whose tone is not calculated in proceeding the process in the X-axis direction, a right and left pixel Z value determining portion 34 to compare the Z values of an unprocessed pixel in the X-axis direction and the pixels in the right and left whose tones are determined, a left pixel tone information setting portion 35 to set the tone information of the pixel in the left for the unprocessed pixel when the Z value of the unprocessed pixel and the Z value of the left pixel are close or equal, a right pixel tone information setting portion 36 to set the tone information of the pixel in the right for the unprocessed pixel when the Z value of the pixel of interest and the Z value of the right pixel are close or equal, an X-axis direction processing pixel determining portion 37 to determine a pixel in the X-axis direction, the tone of which is to be obtained next, a Y-axis direction unprocessed pixel determining portion 38 to determine whether an unprocessed Y-coordinate is present in the Y-axis direction when a process to a certain Y-coordinate in the X-axis direction is completed to the end, an upper and lower pixel tone determining portion 39 to determine whether or not the tones of the pixels above and under an unprocessed Y-axis coordinate have been determined, an upper and lower pixel Z value determining portion 40 to compare the Z value of the pixel whose tone is to be obtained and the Z values of the upper and lower pixels when the upper and lower pixels have different tones, an upper pixel tone information setting portion 41 to set the tone of the upper pixel for the pixel whose tone is to be obtained when the Z value of the pixel is close or equal to the Z value of the upper pixel, a lower pixel tone information setting portion 42 to set the tone of the lower pixel for the pixel whose tone is to be obtained when the Z value of the pixel is close or equal to the Z value of the lower pixel, a Y-axis direction processing pixel determining portion 43 to determine the Y-coordinate of a pixel whose tone is to be obtained next and a tone calculating portion 44 to calculate the tone of a pixel by a shading method.

Figure 6:
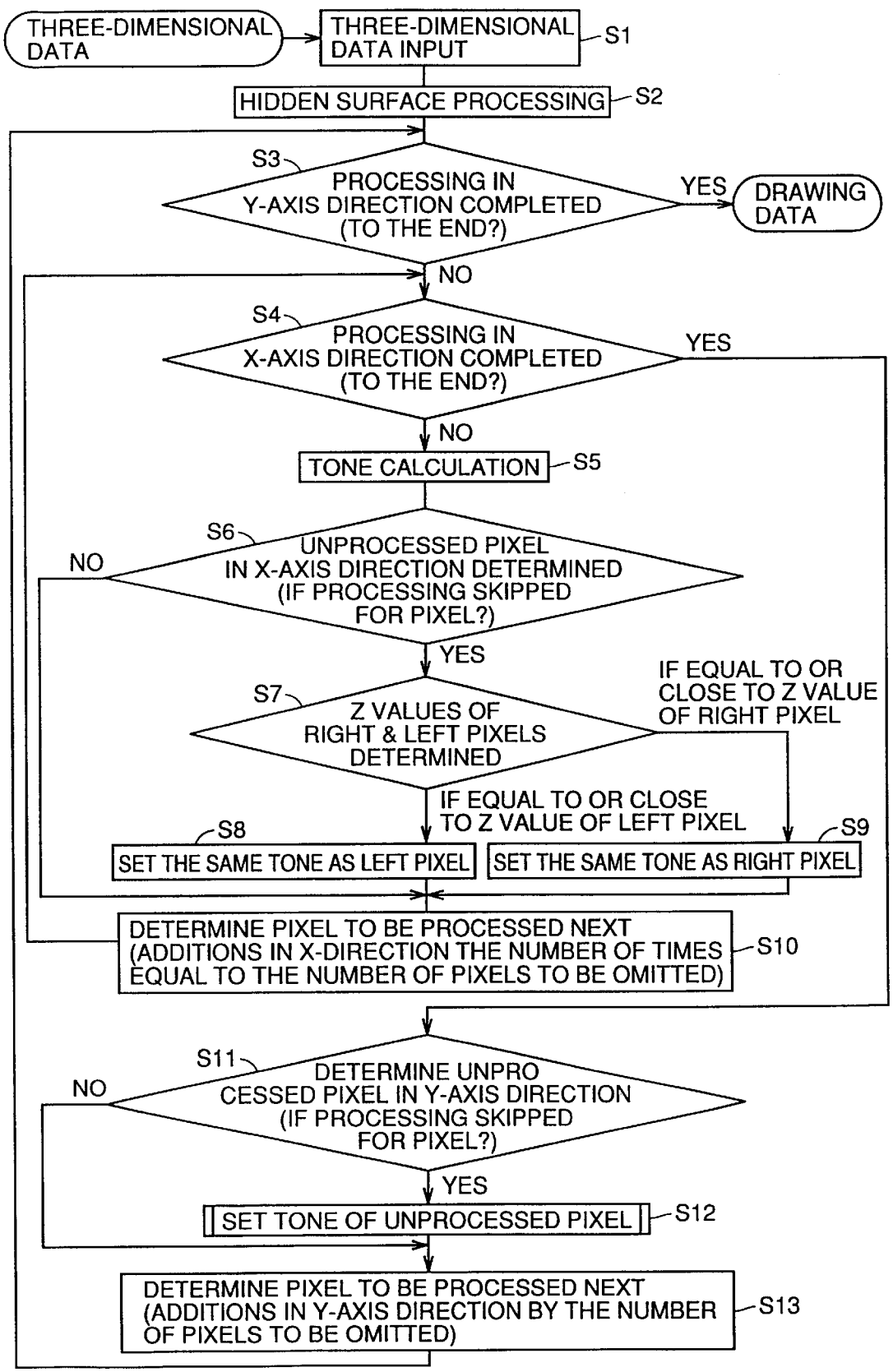
FIG. 6 is a flow chart for use in illustration of steps performed by prescribed pixel tone calculating portion 23 and tone interpolating portion 24.

FIG. 6 is a flow chat for use in illustration of the process using a three-dimensional graphics drawing apparatus according to this embodiment. Various models including a movement model are input to three-dimensional data input portion 21 (S1). Then, hidden surface processing portion 22 determines a region visible on the picture screen based on the three-dimensional data input to three-dimensional data input portion 21 (S2). Once the region visible on the picture screen is determined by hidden surface processing portion 22, Y-axis direction processing end determining portion 31 determines whether the process in the Y-axis direction is performed to the end (S3). If Y-axis direction processing end determining portion 31 determines that the process in the Y-axis direction is performed to the end (Yes in S3), the process is completed as all the necessary data has been produced. If Y-axis direction processing end determining portion 31 determines otherwise (No in S3), the X-axis direction process end determining portion 32 determines whether the process in the X-axis direction is performed to the end in that Y-axis coordinate (S4).

If X-axis direction processing end determining portion 32 determines that the process in the X-axis direction has been completed in the Y-axis coordinate (Yes in S4), the process proceeds to step S11. If X-axis direction processing end determining portion 32 determines otherwise (No in S4), tone calculating portion 44 calculates the tone of a pixel of interest (S5). X-axis direction unprocessed pixel determining portion 33 determines if there is an unprocessed pixel on the left of the pixel subjected to the tone calculation (S6).

If X-axis direction unprocessed pixel determining portion 33 determines that there is no unprocessed pixel on the left of the pixel subjected to the tone calculation (No in S6), the process proceeds to step S10. If X-axis direction unprocessed pixel determining portion 33 determines otherwise (Yes in S6), right and left pixel Z value determining portion 36 compares the Z values of pixels on the right and left of the unprocessed pixel and having their tones already determined and the Z value of the unprocessed pixel (S7).

If light and left pixel Z value determining portion 36 determines that the Z value of the unprocessed pixel is equal or close to the Z value of the pixel present on the left, left pixel tone information setting portion 35 sets the tone information the same as that of the left pixel for the unprocessed pixel (S8). If right and left pixel Z value determining portion 34 determines that the Z value of the unprocessed pixel is equal to or close to the Z value of the pixel present on the right and having its tone already determined, right pixel tone information setting portion 36 sets the same tone information as the right pixel for the unprocessed pixel (S9).

Then, X-axis direction processing pixel determining portion 37 determines the X-coordinate value of a pixel to be subjected to tone calculation next (S10), and the process returns to step S4. More specifically, addition is performed in the X-axis direction the number of times equal to the number of pixels whose tones are not calculated.

Once all the pixels in a row in a certain Y-coordinate included in a certain region has been processed (Yes in S4), Y-axis direction unprocessed pixel determining portion 38 determines if there is an unprocessed row in a Y-coordinate above the processed Y-coordinate (S11). If Y-axis direction unprocessed pixel determining portion 38 determines that there is no unprocessed pixel above the Y-coordinate (No in S11), the process proceeds to step S13. If Y-axis direction unprocessed pixel determining portion 38 determines otherwise (Yes in S11), the unprocessed pixel is subjected to tone setting processing (S12). If then Y-axis direction unprocessed pixel determining portion 38 determines that there is no unprocessed pixel (No in S11), the process proceeds to step S13. In step S13, Y-axis direction processing pixel determining portion 43 determines the Y-coordinate of a pixel to be subjected to tone calculation next (S13), and the process returns to step S3. More specifically, addition is performed in the Y-axis direction the number of times equal to the number of rows whose tones are not calculated.

Figure 7:
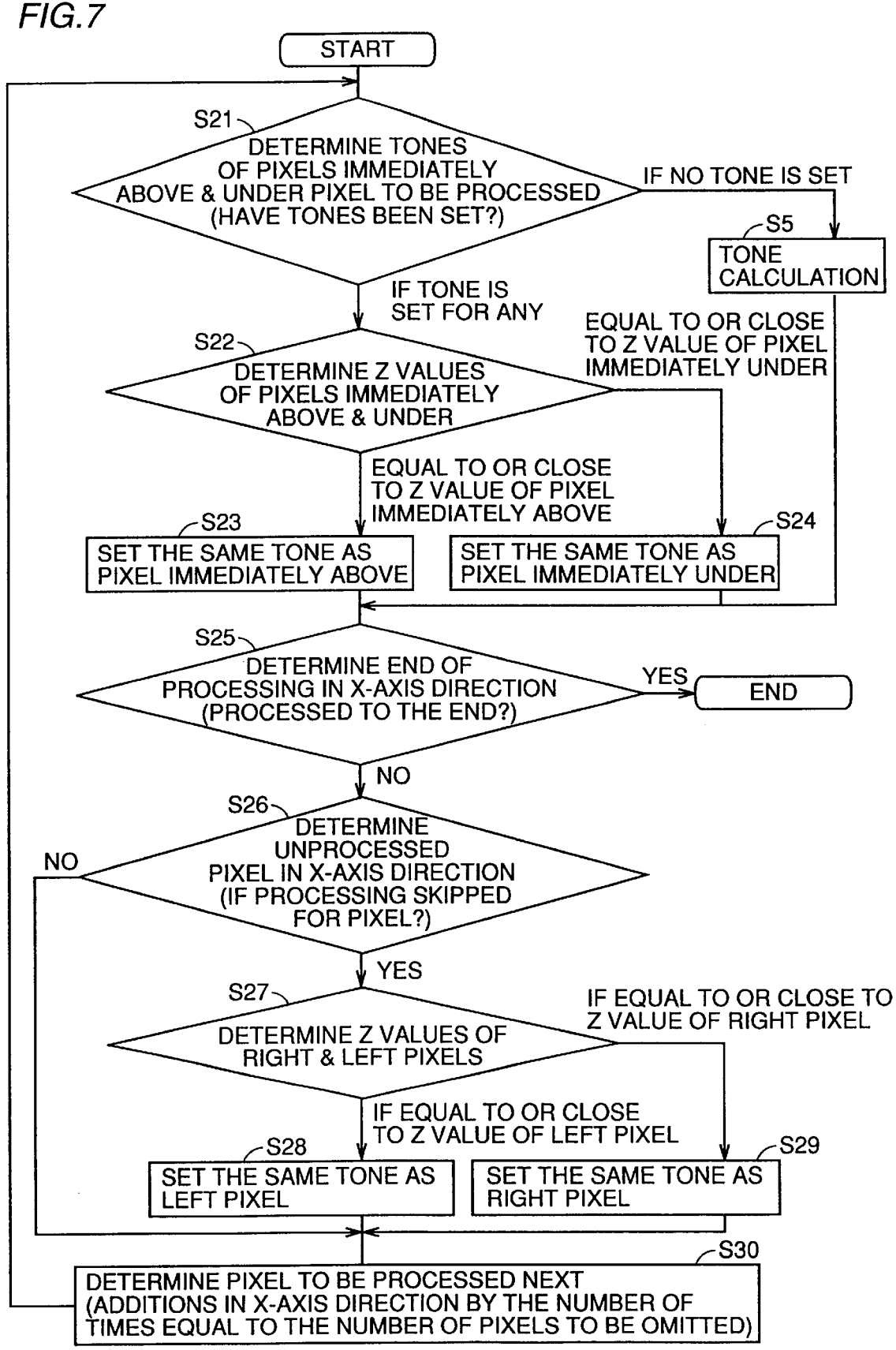
FIG. 7 is a flow chart for use in illustration of the step of setting the tones (S12) of unprocessed pixels.

FIG. 7 is a flow chart for use in illustration of step S12 shown in FIG. 6. Upper and lower pixel tone determining portion 39 determines whether the tone information has been determined for the pixels present above and under an unprocessed pixel (S21). If there is no tone information determined for both upper and lower pixels, tone calculation portion 44 calculates the tones of the pixels as the pixels are part of the background color since they are not in the region to be drawn with the upper and lower pixels (S5). If the tone information is determined for any of the upper and lower pixels, upper and lower pixel Z value determining portion 40 compares the Z value of the pixel of interest and the Z value of each of the upper and lower pixels (S22). If upper and lower pixel Z value determining portion 40 determines that the Z value of the unprocessed pixel is equal or dose to the Z value of the pixel present thereabove, upper pixel tone information setting portion 41 sets the tone information the same as the upper pixel for the unprocessed pixel (S23). If upper and lower pixel Z value determining portion 40 determines that the Z value of the unprocessed pixel is equal or close to the Z value of the lower pixel, lower pixel tone information setting portion 42 sets the same tone information as the lower pixel for the unprocessed pixel (S24).

Then, X-axis direction processing end determining portion 32 determines if all the pixels in the X-axis direction have been processed in the Y-coordinate (S25). If X-axis direction processing end determining portion 32 determines that all the processings in the X-axis direction have been completed (Yes in S25), the process is completed as the tone of the unprocessed pixel has been set. If X-axis direction processing end determining portion 32 determines otherwise (No in S25), X-axis direction unprocessed pixel determining portion 33 determines whether there is an unprocessed pixel on the left of the pixel having its tone determined previously (S26).

If X-axis direction unprocessed pixel determining portion 33 determines that there is no unprocessed pixel (No in S26), the process proceeds to step S30. If X-axis direction unprocessed pixel determining portion 33 determines otherwise (Yes in S26), right and left pixel Z value determining portion 34 compares the Z value of the unprocessed pixel and the Z values of the light and left pixels (S27).

If right and left pixel Z value determining portion 34 determines that the Z value of the unprocessed pixel is equal or close to the Z value of the pixel present on the left, left pixel tone information setting portion 35 sets the same tone information as the left pixel for the unprocessed pixel (S28). If right and left pixel Z value determining portion 34 determines that the Z value of the unprocessed pixel is equal or close to the pixel on the right, right pixel tone information setting portion 36 sets the same tone information as the right pixel for the unprocessed pixel (S29).

Then, X-axis direction processing pixel determining portion 37 determines the X coordinate value of a pixel to be subjected to tone calculation next (S30), and the process returns to step S21.

In this embodiment, among pixels adjacent to a pixel subjected to be tone calculation, the tone of a pixel having a close Z value is set for the pixel of interest, the tones of adjacent pixels may be averaged and the average may be set for the pixel of interest.

As in the foregoing, by the three-dimensional graphics drawing apparatus according to the present invention, the tones of pixels at prescribed intervals are calculated to obtain the tone of a pixel displayed on the picture screen, and pixels are interpolated by referring to the tones of adjacent pixels for the other pixels, so that the number of cycles of the CPU can be reduced. As a result, the drawing speed of three-dimensional graphics can be greatly improved without having to install expensive hardware such as an FPU or a special graphic engine.

When the tone of a pixel is set, the tone of a pixel having a close Z value is employed, the drawing speed of three-dimensional graphics can be improved without degrading the picture quality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional graphics drawing apparatus, comprising:
   a hidden surface calculating portion to determine whether a part is visible on a picture screen based on three-dimensional data;
   a tone calculating portion to calculate tones of pixels at prescribed intervals in the part determined to be visible on the picture screen by said hidden surface calculating portion;
   an interpolating portion to interpolate a pixel whose tone has not been calculated, based on the tones of pixels at the prescribed intervals calculated by said tone calculating portion; and
   a drawing portion to draw graphics on the picture screen based on the result of calculation by said tone calculating portion and the result of interpolation by said interpolating portion;
   wherein said hidden surface calculating portion performs a hidden surface calculation processing by a Z buffer method, and wherein said interpolating portion interpolates said pixel whose tone has not been calculated by referring to a Z value calculated by the Z buffer method.

2. The three-dimensional graphics drawing apparatus according to claim 1, wherein
said interpolating portion includes a tone determining portion to determine the tone of said pixel whose tone has not been calculated, based on a tone of a pixel adjacent to said pixel whose tone has not been calculated.

3. The three-dimensional graphics drawing apparatus according to claim 1, wherein
said tone calculating portion calculates tones of pixels at intervals in the X-axis and Y-axis directions in a part determined to be visible on the picture screen by said hidden surface calculating portion.

4. The three-dimensional graphics drawing apparatus according to claim 1, wherein:
said interpolating portion employs, as the tone of said pixel whose tone has not been calculated, a tone of a pixel having a Z value close to a Z value of said pixel whose tone has not been calculated among adjacent pixels on the right and left of said pixel whose tone has not been calculated.

5. The three-dimensional graphics apparatus according to claim 1, wherein
said interpolating portion employs, as the tone of said pixel whose tone has not been calculated, a tone of a pixel having a Z value close to a Z value of said pixel whose tone has not been calculated among adjacent pixels above and under said pixel whose tone has not been calculated.

6. The three-dimensional graphics drawing apparatus according to claim 1, wherein
said interpolating portion interpolates a pixel whose tone has not been calculated in the X-axis direction, and then interpolates a pixel whose tone has not been calculated in the Y-axis direction, based on the tones of pixels at prescribed intervals calculated by said tone calculating portion.

7. The three-dimensional graphics drawing apparatus according to claim 1, wherein
said tone calculating portion calculates the tones of pixels at intervals in the X-axis and Y-axis direction in a part determined to be visible on the picture screen by said hidden surface calculating portion.

8. The three-dimensional graphics drawing apparatus according to claim 1, wherein
said interpolating portion calculates the tone of said pixel whose tone has not been calculated as a pixel that is part of a background color if tones of adjacent pixels above and under said pixel whose tone has not been calculated have not been determined.

9. A three-dimensional graphics drawing apparatus, comprising:
a hidden surface calculating portion to determine whether a part is visible on a picture screen based on three-dimensional data;
a tone calculating portion to calculate tones of pixels at prescribed intervals in the part determined to be visible on the picture screen by said hidden surface calculating portion;
an interpolating portion to interpolate a pixel whose tone has not been calculated, based on the tones of pixels at the prescribed intervals calculated by said tone calculating portion; and
a drawing portion to draw graphics on the picture screen based on the result of calculation by said tone calculating portion and the result of interpolation by said interpolating portion,
wherein said interpolating portion interpolates a pixel whose tone has not been calculated in the X-axis direction, and then interpolates a pixel whose tone has not been calculated in the Y-axis direction, based on the tones of pixels at the prescribed intervals calculated by said tone calculating portion.

10. A three-dimensional graphics drawing apparatus, comprising:
a hidden surface calculating portion to determine whether a part is visible on a picture screen based on three-dimensional data;
a tone calculating portion to calculate tones of pixels at prescribed intervals in the part determined to be visible on the picture screen by said hidden surface calculating portion;
an interpolating portion to interpolate a pixel whose tone has not been calculated, based on the tones of pixels at the prescribed intervals calculated by said tone calculating portion; and
a drawing portion to draw graphics on the picture screen based on the result of calculation by said tone calculating portion and the result of interpolation by said interpolating portion;
wherein said interpolating portion calculates the tone of said pixel whose tone has not been calculated as a pixel that is part of a background color if tones of upper and lower pixels adjacent to said pixel whose tone has not been calculated have not been determined.

11. A method of drawing three-dimensional graphics, comprising the steps of:
determining whether or not a part is visible on a picture screen based on three-dimensional data by performing a hidden surface calculating processing by a Z buffer method;
calculating tones of pixels at prescribed intervals in the part determined to be visible on the picture screen;
interpolating a pixel whose tone has not been calculated, based on said calculated tones of pixels at the prescribed intervals, by referring to a Z value calculated by the Z buffer method; and
drawing a graphic based on said pixels whose tones have been calculated and said interpolated pixels.

12. A method of drawing three-dimensional graphics, comprising the steps of:
determining whether or not a part is visible on a picture screen based on three-dimensional data;
calculating tones of pixels at prescribed intervals in the part determined to be visible on the picture screen;
interpolating a pixel whose tone has not been calculated, based on said calculated tones of pixels at the prescribed intervals; and
drawing a graphic based on said pixels whose tones have been calculated and said interpolated pixels;
wherein said step of interpolating said pixel whose tone has not been calculated includes calculating the tone of said pixel whose tone has not been calculated as a pixel that is part of a background color if tones of adjacent pixels above and under said pixel whose tone has not been calculated have not been determined.

13. A medium recorded with a three-dimensional graphics drawing program, said program comprising the steps of:

determining whether or not a part is visible on a picture screen based on three-dimensional data by performing a hidden surface calculating processing by a Z buffer method;

calculating tones of pixels at prescribed intervals in the part determined to be visible on said picture screen;

interpolating a pixel whose tone has not been calculated, based on said calculated tones of the pixels at the prescribed intervals, by referring to a Z value calculated by the Z buffer method; and drawing graphics on the picture screen based on said pixels whose tones have been calculated and said interpolated pixel.

14. A medium recorded with a three-dimensional graphics drawing program, said program comprising the steps of:

determining whether or not a part is visible on a picture screen based on three-dimensional data;

calculating tones of pixels at prescribed intervals in the part determined to be visible on said picture screen;

interpolating a pixel whose tone has not been calculated, based on said calculated tones of the pixels at the prescribed intervals; and drawing graphics on the picture screen based on said pixels whose tones have been calculated and said interpolated pixel;

wherein said step of interpolating said pixel whose tone has not been calculated includes calculating the tone of said pixel whose tone has not been calculated as a pixel that is part of a background color if tones of adjacent pixels above and under said pixel whose tone has not been calculated have not been determined.

* * * * *